July 29, 1947. S. S. CRAMER Re. 22,902

SOLENOID TYPE OF ELECTROMAGNET

Original Filed Dec. 27, 1941 2 Sheets-Sheet 1

INVENTOR.
Stanley S. Cramer
BY A. D. T. Libby
Attorney

July 29, 1947. S. S. CRAMER Re. 22,902

SOLENOID TYPE OF ELECTROMAGNET

Original Filed Dec. 27, 1941 2 Sheets-Sheet 2

INVENTOR.
Stanley S. Cramer
BY A. D. T. Libby
Attorney

Reissued July 29, 1947 Re. 22,902

UNITED STATES PATENT OFFICE 22,902

SOLENOID TYPE OF ELECTROMAGNET

Stanley S. Cramer, Haddon Heights, N. J.

Original No. 2,337,375, dated December 21, 1943, Serial No. 424,658, December 27, 1941. Application for reissue December 8, 1944, Serial No. 567,135

21 Claims. (Cl. 175—341)

This invention relates to a solenoid type of electro-magnet wherein rotary motion may be delivered directly by the movement of the solenoid core or plunger. In practically all solenoids with which I am familiar, the core or plunger moves within the electro-magnet in substantially a straight line or parallel to the axis of the magnet. In these prior-art solenoids, the initial magnetic pull on the plunger is relatively weak and increases in strength until the electro-magnetic influence on the plunger has reached its maximum pull: In many cases the movement terminates in a bang or blow. To get a movement of the plunger of much length, the electro-magnet has to be relatively long and this, in many cases, means taking up valuable space. Also, with these prior-art solenoids, in order to get rotary motion, the plunger must be interconnected with other apparatus through the medium of a system of levers, gears or equivalent means, and where the load is known and a certain travel thereof is required, the magnetic influence on the plunger must be sufficient at its weakest or starting point to move the load. This results in an electro-magnet which takes up a large amount of current to produce the necessary pull at the start, with the result that at the end of the pull the electro-magnet is overexcited and if the load is held for any length of time, the electro-magnet is heated up excessively. Hence, such a structure must be made of proportions which will dissipate the heat.

It is the principal object of my present invention to provide a solenoid type of electro-magnet in which the plunger is generally circular in form and wherein the distribution of the metal in the plunger is such that a relatively small and short coil can be used and still obtain an extremely long movement of the plunger which can deliver rotary motion to a desired piece of apparatus directly from the rotatable axis of the plunger.

Another object of my invention is to provide a solenoid which will directly deliver rotary motion through a relatively large angle; for example, as great as 300 degrees or more.

A still further object of my invention is to provide a solenoid in which the rotary motion is such that the torque delivered is generally uniform over its entire working range.

A further object of my invention is to provide an electro-magnet of the solenoid type wherein the plunger may be allowed a certain initial start before picking up its load.

A further object of my invention is to provide a solenoid in which the load may be released from the solenoid plunger at any desired degree of arcuate movement of the plunger.

These and other objects will be discerned from a reading of the following specification taken in connection with the annexed drawings wherein.

Figure 3:
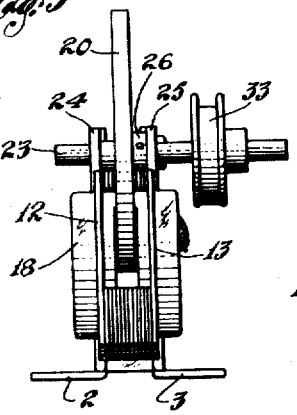
Figure 3 is a view of Figure 1 looking from left to right.
Figure 6:
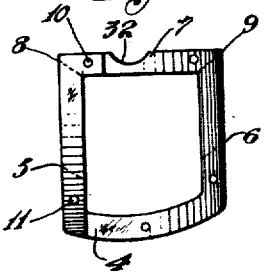
Figure 6 is a side view of the field frame used with the electro-magnet.
Figure 7:
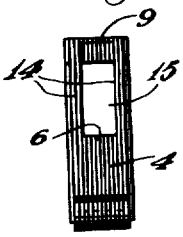
Figure 7 is a view of Figure 6 looking from right to left.

Referring now to the details wherein like numbers refer to corresponding parts in the various views, 1 is a frame support member having feet 2 and 3 for supporting the structure on a mounting member. The frame 1 carries a field structure made up of laminations of good magnetic material. The field has a bottom portion 4 which begins at the dotted line 5 and continues, for most of the way, in an arcuate manner as shown in Figure 6, around to the dotted line 6. The field also has a top portion 7 terminating between the dotted lines 8 and 9. These laminations are held together at one end of the electro-magnet by rivets 10 and 11 which pass through binding strips 12 and 13 preferably of non-magnetic material. At the opposite end, which is shown in Figure 7, the laminations 4 are supplemented by additional laminations 14 which extend upwardly into magnetic engagement with the end 9 of the upper lamination 7. In this construction an opening or orifice 15 is formed at one end of the field structure, while the other end is open between the binding strips 12 and 13 as shown in Figure 3, and, as indicated in Figures 6 and 7, the opening 15 is considerably smaller than the opening between the strips 12 and 13.

Figure 8:
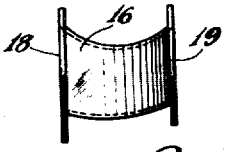
Figure 8 is a side view of the spool or form carrying the winding of the electro-magnet.
Figure 5:
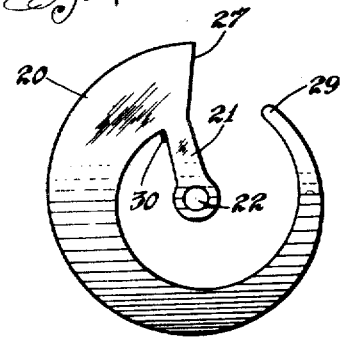
Figure 5 is a view of the solenoid plunger.

A winding form 16, shown in Figure 8, carries a winding 17. The heads 18 and 19 of the winding form are slotted as shown in Figure 3 to allow for the passage of the core plunger 20 which, as shown in Figure 5, has an arm 21 with a hole 22 therein to receive a shaft 23 which is pivoted on opposite portions 24 and 25 of the frame member 1. The arm 21 has a hub projection that may be of non-magnetic material which receives a set screw 26 for fastening the plunger 20 to the shaft 23.

Figure 1:
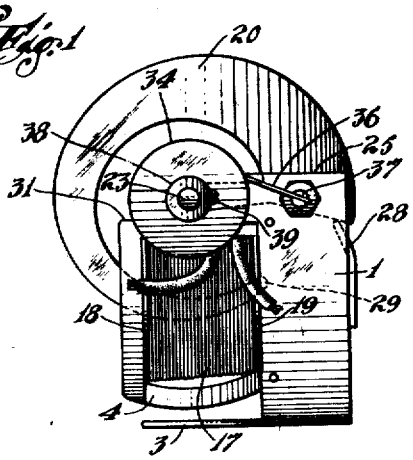
Figure 1 is a side view of one form of my invention, showing the plunger in idle position.
Figure 2:
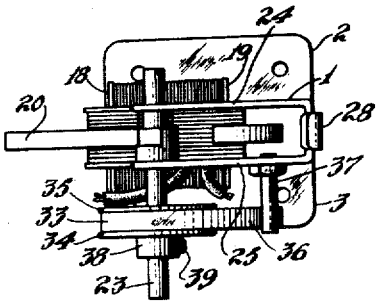
Figure 2 is a plan view of Figure 1, but showing the plunger partially rotated.
Figure 4:
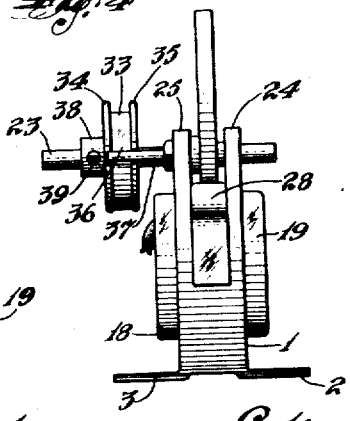
Figure 4 is a view of Figure 1 looking from right to left.

As shown in Figure 5, the plunger 20 is generally circular in form and has a continually varying cross-section tapering from one end to the other. As a matter of fact, the form of plunger is generally like an Archimedes spiral and is made up of good magnetic material, either in a single piece or of laminated stock. As shown in Figures 1 and 4, the end 27 is normally positioned against a stop member 28 of non-magnetic material held in the upright portion of the frame 1 and, as shown in Figure 1, the other end 29 of the plunger 20 extends practically through the form 16 and the winding 17.

It will be seen by reference to Figure 8, that the winding spool or form 16 is considerably smaller at the end 19 than at the end 18 and that the hole through the spool or form 16 is arcuate in shape to conform to the general contour or form of the solenoid plunger 20. While the winding spool or form 16 is arcuate in shape, its heads 18 and 19 are parallel, which provides a spool that is easy to wind and one which will take more turns than a spool with heads positioned out of parallelism.

The arm 21 of the plunger is provided with a bumper-and-spacing member 30 which is adapted to contact with the end 31 of the frame member 1 which, as shown in Figure 6, is slightly cut out at 32 to provide a spacing for the end of the arm 21 and its hub carrying the set screw 26.

It is evident that as the arcuate plunger 20 is drawn through the spool 16, the impedance of the electromagnet, when alternating current is used, increases and the ampere turns decrease accordingly, and the pull tends to decrease; but as the plunger turns, more and more of its weight moves to the left of a vertical plane through the shaft 23, looking at Figure 1, and I have found that this gradually increased weight to the left of this vertical plane then begins to act by gravity to compensate for the loss in magnetic pull and hence functions in a positive manner in the general torque reaction.

For returning the plunger and its load back to idle position, a spring 36 is illustrated. The reaction of the spring 36 is so small as compared with the torque reaction of the plunger as to only slightly modify its pull thereof and the plunger of course can be modified to compensate for this, if compensation is found desirable.

Mounted on the end of the shaft 23 is a spool 33 having disc-type flanges 34 and 35 between which the spring 36 is coiled up, one end of the spring being fastened to the spool 33 and the other end to a stud 37 which is fastened to the frame 1. The spool 33 has a hub 38 carrying a set screw 39 for fastening the spool to the shaft 23.

By reason of the construction as above described, I have found that the magnetic flux set up by the winding 17 in combination with the circular type of solenoid used, is such that the movement of the plunger 20 delivers a fairly uniform torque in its arcuate movement; whereas, with the ordinary type of solenoid, the plunger moves with ever-increasing speed and force as it is drawn into the electro-magnet.

In Figures 9 to 12 inclusive, the construction of the electro-magnet and the plunger 20 and field structure is the same as has already been described, the differences residing in certain details. These details comprise a sleeve 40 having a pair of spaced discs 41 and 42. Between the discs and fastened to the sleeve is a spring 43 having its free end fastened to a stud or pin 44 which in turn is fastened to the frame member 1. The sleeve 40 has one end 45 which may be reduced in diameter and to which is attached the arm 21 of the plunger 20. The shaft 23 has an outboard bearing 46 and carries the same type of spool 33 as shown in Figure 1, having side discs 34 and 35 between which is positioned the spring 36 which is also attached to the stud 44 to which the spring 43 is fastened.

The adjacent discs 35 and 41 carry automatic engagement and disengagement parts between the shaft 23 and the sleeve 45 carrying the plunger 20. These engagement parts include a pawl 47 pivoted to the disc 41 and a pin 48 carried by the disc 35. The pawl 47 has fastened thereto a spring 49 which engages a circular portion 50 forming part of the sleeve 45 as shown in Figure 12.

Figure 12:
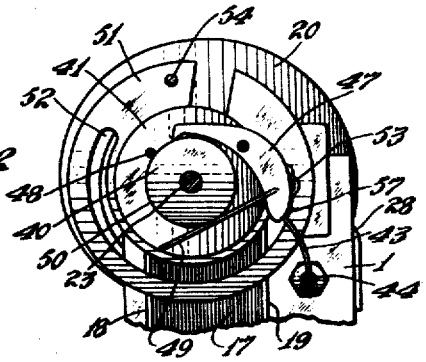
Figure 12 is a section on the line 12—12 of Figure 11.

It will be seen from Figure 12, that, normally, the end of the pawl—when the solenoid is in idle position—is only a short distance away from the pin 48. When the plunger 20 starts its rotary movement, there is no load applied to the plunger until the pawl 47 engages the pin 48. Then the shaft 23 is started on its rotary movement and will continue for the full arcuate stroke of the solenoid 20 unless released.

It is sometimes advantageous to release the load from the plunger at some arcuate distance, and to do this, a circular member 51 is arcuately adjustably carried in the frame member 1 by means of a slot 52 through which a set screw 53 passes. The member 51 has a release pin 54 extending over the path of movement of the pawl 47. By shifting the location of the member 51 through the medium of the screw 53 and the slot 52, the pin 54 may be set to release the load at any desired arcuate movement of the plunger 20. When this release takes place, the spring 36 will return the shaft 23 back to normal position, whereby a pin 55 will engage a stop stud 56.

When the current is cut off the winding 17, the spring 43 will return the solenoid 20 back to its normal position as heretofore described. Preferably, the end 57 of the pawl is formed so that on a return movement, it will readily pass under the release pin 54 so the plunger core can return to normal position independently of the shaft 23.

Figure 13:
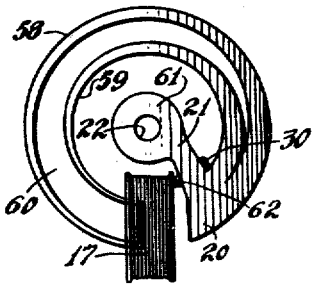
Figure 13 is a view similar to Figure 5, showing a modified form of solenoid plunger.
Figure 9:
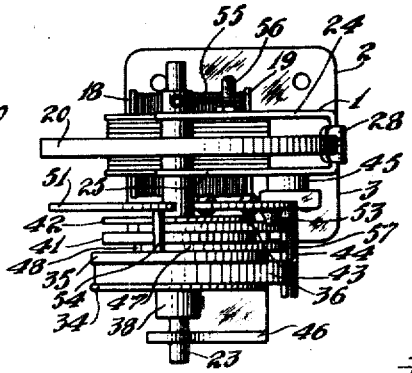
Figure 9 is a plan view similar to Figure 2, but of a modified construction and with the plunger in idle position.
Figure 10:
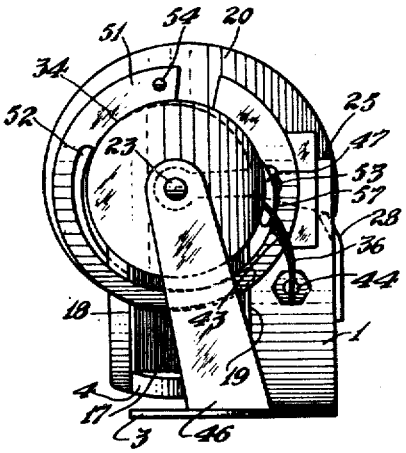
Figure 10 is an end view of Figure 9.
Figure 11:
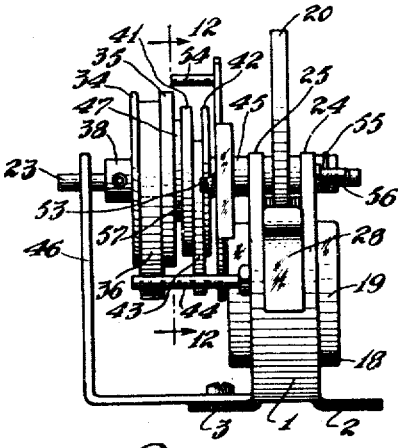
Figure 11 is a side view of Figure 9 looking from right to left.

Figure 13 shows a modified form of solenoid plunger which is open just sufficiently to allow the electro-magnet 17 to be placed in operative position on support members which are not shown in this view. The outer boundary 58 and the inner boundary 59 of the plunger in this particular form are circular, and the space 60 varies in cross-sectional area from substantially one end of the plunger to the other the largest sectional area being at the winding-entering end of the plunger as is clearly shown in this figure. Furthermore, the central portion of the solenoid has a different hub portion 61 than that shown in Figure 3. In this form of construction of the plunger, the gap between it and the field of the electro-magnet is kept substantially constant, and high efficiency of operation is secured if the proper amount of metal is removed from the portion 60, depending on the environment in which the structure is to be used. In other words, the distribution of the metal in the plunger will change its torque characteristics over its working range, but I prefer, especially for operating tuning condensers, that the distribution of the metal in the plunger be such that the torque is substantially uniform throughout its movement. The arm 21 is provided with a stop 30 and a no-load stop 62.

It may be noted that the lever arm 21 in either form of plunger illustrated acts to increase the torque applied to the shaft, which is a decided advantage over other types of solenoids. Furthermore, it may be noted that in the usual type of solenoid the plunger really has no bearing and has what might be termed a sloppy motion, whereas in the present construction the rotary shaft carrying the plunger has bearings and thus provides an even turning motion. By making the diameter of the plunger 20 approximately four inches and the other parts to suit, I can obtain a movement of approximately three hundred degrees, and it is very easy to obtain 180 degrees with a plunger only two inches in diameter and a winding only approximately one inch in length.

By reason of the construction shown in Figures 9 to 12 inclusive, it will be seen that I have provided an arrangement whereby the shaft 23 may be released from engagement with the solenoid plunger at any arcuate movement of the plunger, thereby making the device applicable to many classes of service, such as on counters or release valves under temperature or thermostatic control, printing presses, book-binding equipment, conveying or routing apparatus, magnetic switch and relay control, and many other applications, especially in operating the movable element of a radio tuning condenser having a travel of 180 degrees.

If the load is to be held for any length of time after the plunger reaches its maximum range of movement and alternating current is used, it may be advisable, in the form of plunger shown in Figure 5, to provide the plunger with an adjustable magnet core-closing device whereby the field circuit of the electro-magnet may be substantially closed. By closing the magnetic circuit of the electro-magnet, the impedance thereof is increased and the current will be cut down, thereby preventing the winding from overheating. However, for many uses this will not be necessary; it probably would not be necessary with the form shown in Figure 13.

Figure 14:
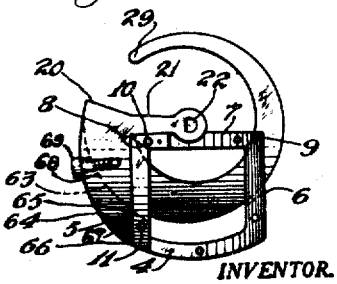
Figure 14 is a view of a core-closing form of solenoid plunger in fully operated position in the field frame and showing the closure of the field frame at the larger opening therein.

To illustrate this point, reference is made to Figure 14, wherein the plunger 20 has been provided with an adjustable field closing piece of magnetic material similar to that used in the plunger 20 at the big end as indicated by the portion between the normal boundary line 63 and the line 64, so the portions between the points 65 and 66 overlap the gap in the large opening in the field structure, and closes the field at this end of the electromagnet to produce the result above described. The piece 67 has a slot 68 therein to receive an adjusting screw 69 going into the plunger 20 so the closing out piece 67 may be properly positioned on the plunger 20. By using a field structure as heretofore described in association with the winding, I get a greatly improved and much more efficient structure than has heretofore been produced.

From the above, it will be seen that certain of the details may be varied considerably without departing from the spirit of my invention and the scope of the appended claims.

What I claim is:

1. A solenoid type of electro-magnet comprising a spool having an arcuately formed interior passageway, the spool having a winding arranged thereon, a field structure of magnetic material encircling the winding, a rotatable shaft mounted adjacent one portion of the field structure, a circularly formed core carried by said shaft, the core forming nearly a complete circle and tapering from one end to the other, the small end normally being positioned within the arcuately formed passageway in the spool and between opposite portions of the field structure.

2. A solenoid type of electro-magnet comprising a spool having an arcuately formed interior passageway, the spool having a winding arranged thereon, a field structure of magnetic material encircling the winding, a rotatable shaft mounted adjacent one portion of the field structure, a core carried by said shaft and having a form quite similar to a spiral of the Archimedes type with its small end normally positioned within the arcuately formed passageway in the spool and between opposite portions of the field structure.

3. An electro-magnet for transmitting rotary motion comprising, a winding having a hollow winding form, a field structure of magnetic material spanning the greater part of the winding longitudinally of its length, a core of magnetic material mounted on a shaft rotatable over a part of said field structure, the core being arcuately formed with one end normally extending a substantial distance through the hollow form and adapted to project in one arcuate path over a part of the field structure when the winding is energized.

4. An electro-magnet for transmitting rotary motion comprising, a winding having a hollow winding form, a field structure of magnetic material spanning the greater part of the winding longitudinally of its length, a core of magnetic material mounted on a shaft rotatable over a part of said field structure, the core tapering from end to end with the small end normally extending substantially through the hollow form and adapted to project in an arcuate path over a part of the field structure when the winding is energized.

5. An electro-magnet for transmitting rotary motion comprising, a winding having a hollow winding form, a field structure of magnetic material spanning the greater part of the winding longitudinally of its length, a core of magnetic material mounted on a shaft rotatable over a part of said field structure, the core having a form similar to a spiral of the Archimedes type with its small end normally extending substantially through the hollow form and adapted to project in an arcuate path over a part of the field structure when the winding is energized, and means for returning the core to normal position after it has been operated by the winding.

6. An electro-magnet for directly transmitting rotary motion comprising a field structure of magnetic material, a winding having a hollow winding spool positioned within the confines of said field structure, the field structure having space openings at opposite ends of the winding in alignment with the hollow form, a core of magnetic material rotatably mounted adjacent a part of the field structure, the core being tapered and circular and normally having its small end projecting through one of said field openings within the winding, with its large end normally adjacent the other opening of the field structure.

7. An electro-magnet for directly transmitting rotary motion comprising a field structure of magnetic material, a winding having a hollow arcuately formed winding spool positioned within the confines of said field structure, the field structure having space openings at opposite ends of the spool, one space opening being bounded by at least some of the magnetic material while the other opening is formed by only two oppositely spaced magnetic parts, a core of magnetic material having a form similar to a spiral of Archimedes with the small end normally entering the spool through the first-mentioned opening, while the large end is normally positioned adjacent one end of the second opening, a shaft rotatably mounted on the structure and carrying said core, and means for reutrning the core to normal position after having been actuated by said winding.

8. An electro-magnet structure for transmitting rotary motion through an angle of at least 180 degrees at a substantially uniform arcuate speed, the structure including a winding, magnetic material disposed around the winding forming a flux path with openings in the path at opposite ends of the winding, a shaft rotatably supported exteriorly of the winding, a core forming nearly a circle but tapering from end to end, with its small end normally passing through one of the openings in the flux path and well within the winding, while the larger end of the core is normally positioned adjacent the other of said openings and connected to said shaft, and means connected to said shaft for retarding its rotation and returning the core to normal position after having been moved by energization of the winding.

9. An electro-magnet for transmitting rotary motion having an energizing winding and a shaft rotatably mounted outside the winding, a sleeve rotatably carried on the shaft, a circular type of plunger core fastened to the sleeve, means for completing a driving connection between the sleeve and shaft, and means for releasing the driving connection between the sleeve and shaft at a predetermined arcuate movement of the shaft.

10. An electro-magnet for transmitting rotary motion having an energizing winding and a shaft rotatably mounted outside the window, a sleeve rotatably carried on the shaft, a circular type of plunger core fastened to the sleeve, means for completing a dri ing connection between the sleeve and shaft, means for releasing the driving connection between the sleeve and shaft at a predetermined arcuate movement of the shaft, and means for returning the shaft to initial starting position after it is released from said sleeve and plunger core.

11. An electro-magnet as set forth in claim 9, further characterized in that the sleeve carries a pair of spaced discs, a spring positioned between said discs, one end of the spring being anchored to the sleeve, while the other end is fastened to a fixed member of the electro-magnet, and further defined in that a spring-actuated pawl is carried by one of said discs for completing the driving connection with a pin carried by a member fastened to said shaft.

12. An electro-magnet as set forth in claim 9, further characterized in that the release means comprises a member arcuately adjustably carried on the magnet structure, the member having a pin extending over the path of movement of a spring-actuated pawl which acts as part of the driving connection between the shaft and sleeve, the drive connection being completed by a stop device carried by a member fastened to the shaft.

13. An electro-magnet for transmitting rotary motion having an energizing winding and a shaft rotatably mounted outside the winding, a sleeve rotatably carried on the shaft, a circular type of plunger core fastened to the sleeve, a pair of spaced discs carried by the sleeve, another pair of spaced discs fastened to the shaft adjacent the sleeve discs, a spring-actuated pawl positioned between immediately adjacent discs of the two pairs of discs, one of these last-mentioned discs having the pawl pivotally mounted thereon, while the other disc has a pin adapted to be engaged by the pawl, a return spring located between the discs of each pair and both springs being anchored to a stationary member of the magnet, while the other end of one spring is operatively connected to the shaft and the end of the other spring is connected to the sleeve, a disc-like member adjustably carried by the magnet structure and having a release pin extending into the path of movement of the pawl, the pawl being formed so it can pass under the release pin to allow the plunger core to return to normal position independently of the shaft.

14. A solenoid type of electro-magnet having an arcuately formed plunger with an arm at one end extending inwardly toward the axial center of the plunger, a rotatable shaft fastened to the inner extremity of said arm for transmitting power from the plunger to a load, and means for allowing the plunger and shaft to move a certain amount before picking up the load.

15. A solenoid type of electro-magnet having an arcuately formed winding form with a single winding thereon, a plunger in the form of a ring which is open a distance approximately equal to the length of the winding form, the plunger having a central portion carried on a rotatable shaft, and an arm connecting the central portion to one end of the open ring.

16. A solenoid type of electro-magnet having a single winding with a circularly formed winding form and an open-ring plunger fastened at its center to a rotatable shaft, the plunger being hollow for the major portion of its length, the hollow part varying in cross-sectional area along its length, the greatest sectional area being at the winding-entering end.

17. A solenoid type of electromagnet comprising a spool having a winding arranged thereon, the spool having an arcuately formed interior passageway smaller at one end than at the other and having a shape to conform to the general contour of a plunger core to move therein, a field structure of magnetic material encircling the winding and having openings conforming to those in the spool, a rotatable shaft mounted adjacent one portion of the field structure, a circularly formed plunger core carried by said shaft for movement within said spool, the plunger core forming the major part of a circle and tapering from one end to the other, the small end being normally positioned within the arcuately formed passageway in the spool and between opposite portions of the field structure.

18. A solenoid type of electromagnet structure as set forth in claim 17, further characterized in that the plunger core has adjustable means for closing the field at the large end of the spool when the plunger core is moved to full operative position.

19. An electromagnet structure for transmitting rotary motion through a wide angle having a spool with an energizing winding thereon, the spool having an arcuate tapering hole therethrough, a field structure encircling the winding and having different-size openings at its opposite ends to accommodate a plunger core of varying cross-section, and a generally circular plunger core tapering from end to end and mounted to move through said field, the spool and winding.

20. An electromagnet structure as set forth in claim 19, further characterized in that the plunger core has means for closing the field at the larger opening when the plunger core is moved to full operative position.

21. An electromagnet structure for transmitting rotary motion including, a spool having an arcuately formed passageway therethrough and carrying a winding, a field of magnetic material encircling the winding, a plunger core rotatably mounted on the structure, the plunger core being circular in form and varying in cross-sectional area along its arcuate length, and having one end normally positioned well within the spool, whose passageway as well as the ends of the field are formed to conform to the varying cross-section of the plunger core, whereby desired torque characteristics are obtained.

STANLEY S. CRAMER.

REFERENCES CITED

The following references are of record in the file of this patent:

UNITED STATES PATENTS

| Number | Name | Date |
|---|---|---|
| 557,229 | Ray | Mar. 31, 1896 |
| 621,417 | Hungerbuhler | Mar. 21, 1899 |
| 1,585,216 | Tugendhat | May 18, 1926 |
| 273,888 | Piette | Mar. 13, 1883 |
| 1,657,855 | Decker | Jan. 31, 1928 |
| 2,337,375 | Cramer | Dec. 21, 1943 |

Certificate of Correction

Reissue No. 22,902. July 29, 1947.

STANLEY S. CRAMER

It is hereby certified that errors appear in the printed specification of the above numbered patent requiring correction as follows: Column 7, line 26, claim 7, for "reutrning" read *returning*; line 59, claim 10, for "window" read *winding*; and that the said Letters Patent should be read with these corrections therein that the same may conform to the record of the case in the Patent Office.

Signed and sealed this 30th day of September, A. D. 1947.

[SEAL]

THOMAS F. MURPHY,
*Assistant Commissioner of Patents.*